May 20, 1952  C. H. WOLF  2,597,832

EXPANDING FISHHOOK ASSEMBLY

Filed April 22, 1946

INVENTOR.
Charles H. Wolf
BY
ATTORNEY.

Patented May 20, 1952

2,597,832

UNITED STATES PATENT OFFICE 2,597,832

EXPANDING FISHHOOK ASSEMBLY

Charles H. Wolf, Kansas City, Mo.

Application April 22, 1946, Serial No. 664,054

2 Claims. (Cl. 43—37)

This invention relates to fishing tackle or similar devices and has for a primary aim to provide an expanding fish hook assembly of the fish lure nature wherein the hooks are projected from a guarded position by relative movement between a shank and the lure body.

One of the important objects of this invention is to provide a fish hook assembly wherein is included a number of normally guarded hooks operatively joined to a shank in the lure body and shiftable to an unguarded condition where the fish may be impaled thereon when a strike occurs.

A yet further aim of the invention is that provision of a fish hook assembly, in the nature of a plug, a spoon or other forms of lures such as bucktail, all without appreciably deviating from the prime object of the invention which is to automatically project the hooks when the fish strikes.

Other important objects will appear during the course of the following specification referring to the accompanying drawing, wherein.

The form of the invention about to be described and illustrated in the accompanying drawing is capable of maintaining the hooks thereof in a guarded or retracted condition or position until such time as the fish strikes to cause relative shifting between the shank and the lure body of the assembly. When a pull is exerted upon the lure body of the assembly due to the strike by the fish, the shank is shifted to force the hooks to an extended position where positive snaring will occur. Means for releasably maintaining the sections in a "set position" is provided and when this said means is holding the hooks in a guarded state, there is no danger of the hooks becoming entangled in growth or brush in the water through which the assembly is being drawn by the fisherman. It is to be concluded therefore, that the broad objects of the invention i. e. to maintain the hooks guarded until a strike occurs and to hold the hooks in a condition where entanglement will not occur, are fulfilled.

The structure chosen for illustrating the invention teaches the manner in which the same may be employed in a casting or trolling lure type of artificial bait.

Figure 1:
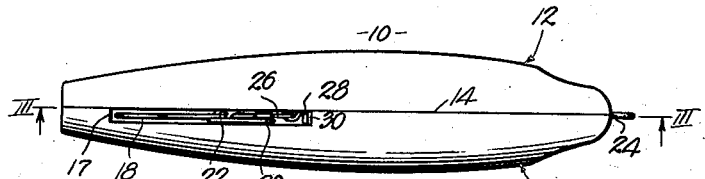
Figure 1 is an inverted plan view of an expanding fish hook assembly made in accordance with the present invention.
Figure 4:
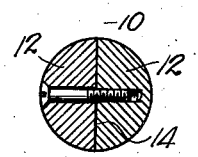
Fig. 4 is a cross sectional view taken on line IV—IV of Fig. 2 and looking in the direction of the arrows.
Figure 2:
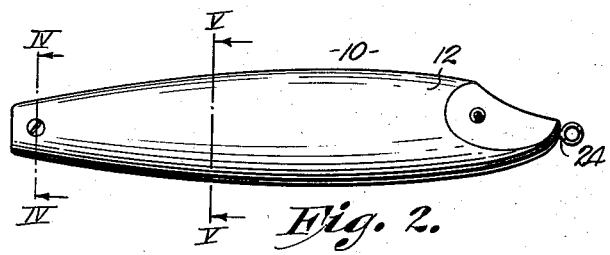
Fig. 2 is a side elevational view thereof.
Figure 5:
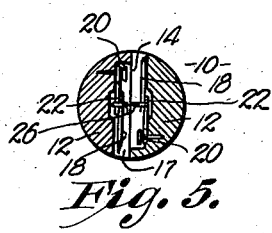
Fig. 5 is a similar cross sectional view taken on line V—V of Fig. 2.
Figure 3:
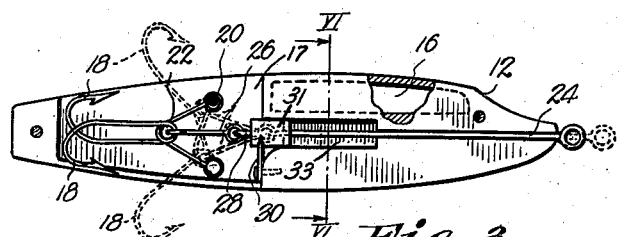
Fig. 3 is a longitudinal central sectional view taken on line III—III of Fig. 1.
Figure 6:
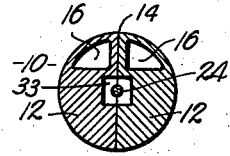
Fig. 6 is a cross sectional view taken on line VI—VI of Fig. 3 and looking in the direction of the arrows.
Figure 7:
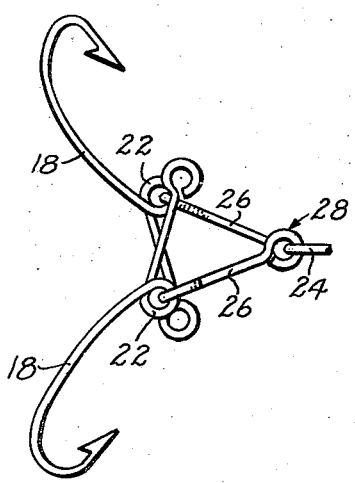
Fig. 7 is a plan view of the expanded fish hook assembly entirely removed from the lure body.

A body 10 is divided along a longitudinal line 14 to establish two distinct sections 12 in each of which is a chamber 16 of suitable capacity to insure balance and buoyancy. Dividing body 10 into two portions permits forming the same from plastic or other desired materials with a cavity 17 therein to receive one or more hooks 18. In the form shown, a pair of hooks 18 are mounted in cavity 17 for projection to the positions shown in dotted lines in Fig. 3 and in full lines in Fig. 7. Each hook 18 is pivotally secured as at 20 and a loop 22 intermediate the ends of each hook 18 is joined to a shank 24 that is relatively shiftable longitudinally because of its form and association with body 10. Shank 24 is in the nature of an elongated rod joined to hooks 18 by respective links 26. These links engage loops 22 at their one end and are loosely hinged as at 28 to the inner end of shank 24.

A detent 30 comprising an elongated, resilient member, engages a notch 29 in a block 31 on shank 24. Thus, when shank 24 is moved to the position shown in dotted lines in Fig. 3, hooks 18 will be shifted from the guarded to the unguarded position (dotted line) (see also Fig. 7), to positively snare or impale the fish that has struck the lure.

Figure 8:
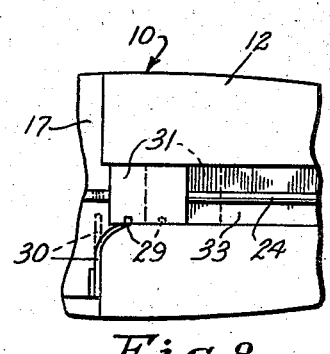
Fig. 8 is an enlarged, fragmentary, sectional view similar to Fig. 3 showing the operation of the yieldable holding assembly.

Polygonal block 31 reciprocates in elongated bore 33 that communicates with cavity 17 and receives shank 24. As shown in Fig. 8, as block 31 moves away from cavity 17, detent 30 will yield until cleared by block 31, whereupon detent 30 will snap to the dotted line position shown in Fig. 8, free of notch 29. On re-setting, detent 30 will yield in the opposite direction until received by notch 29.

Any number of hooks 18 may be mounted within cavity 17 for movement laterally with respect to the sections 12, and while detent 30 is holding hooks 18 in the retracted or guarded position, the lure may be drawn through brush, weeds or other growth without danger of the hooks becoming entangled.

From the foregoing it will be observed that an expanding fish hook assembly capable of protecting the hooks against entanglement during the casting operation has been provided. These said hooks will readily and effectively snap to the operative position upon the occurrence of a strike and the lateral disposition of the hooks is such as to preclude the escape of the fish when once impaled.

It is further notable that in the form of the invention illustrated and described, the movement of the hooks is outwardly and laterally to that being traveled by the assembly when the strike occurs. The piercing action of the hooks is enhanced by such movement as well as by the pull exerted by the fisherman and the energy created by the fish in its effort to throw the artificial bait from its mouth.

Manifestly, assemblies having physical characteristics different from those illustrated and described may be produced without departing from the spirit of the invention or scope of the appended claims.

Having thus described my invention what I claim as new and desire to secure by Letters Patent is:

1. A fish hook assembly in the nature of a lure and comprising a hollow body; a pair of fish hooks pivotally mounted in said body for swinging movement to and from a position within said body; an elongated shank slidably mounted in said body for movement in a plane intersecting a plane through the pivotal axes of said hooks; a link for each hook respectively; means common to said links for pivotally joining the same to one end of said shank, said links each being pivotally connected to a respective hook intermediate the ends of the latter; and interlocking means on the shank and the body respectively for yieldably holding the shank in a position where the hooks are disposed entirely within the body, said pivotal axes of the hooks being spaced apart, said means including a reciprocable block on the shank and a yieldable detent carried by the body and normally engaging the block, there being a notch in the block for receiving the detent when the latter engages the block.

2. A fish hook assembly in the nature of a lure and comprising a hollow body; a pair of fish hooks pivotally mounted in said body for swinging movement to and from a position within said body; an elongated shank slidably mounted in said body for movement in a plane intersecting a plane through the pivotal axes of said hooks; a link for each hook respectively; means common to said links for pivotally joining the same to one end of said shank, said links each having a closed loop pivotally connected to a respective hook intermediate the ends of the latter; and interlocking means on the shank and the body respectively for yieldably holding the shank in a position where the hooks are disposed entirely within the body, said hooks each being rebent upon themselves to present an integral loop coiled through corresponding loops of said links.

CHARLES H. WOLF.

REFERENCES CITED

The following references are of record in the file of this patent:

UNITED STATES PATENTS

| Number | Name | Date |
| --- | --- | --- |
| 446,827 | Cass | Feb. 17, 1891 |
| 1,372,831 | Roderick | Mar. 29, 1921 |
| 1,385,536 | Gleason | July 26, 1921 |
| 1,486,028 | Meighen | Mar. 4, 1924 |
| 1,639,766 | Fisher | Aug. 23, 1927 |
| 1,694,697 | Beidatsch | Dec. 11, 1928 |
| 2,079,509 | Kettring | May 4, 1937 |
| 2,244,980 | Abramson | June 10, 1941 |